April 25, 1950 V. A. SCHOENBERG 2,505,149
TRIGONOMETRIC CALCULATOR
Filed Nov. 21, 1946 2 Sheets-Sheet 2
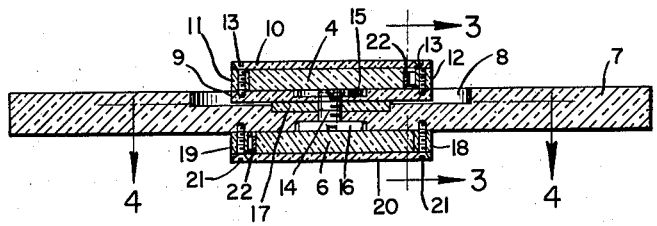
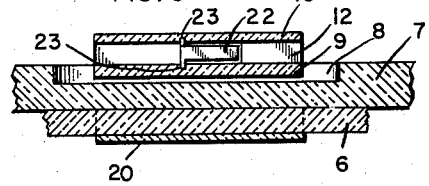
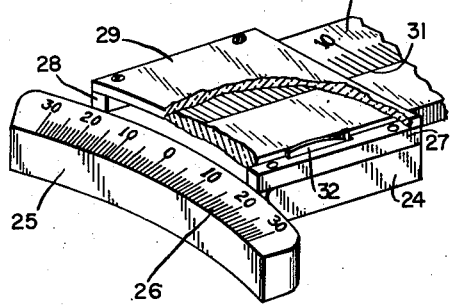
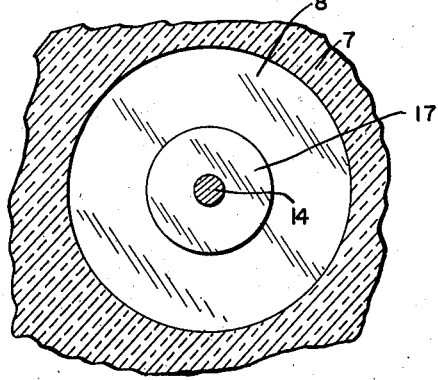
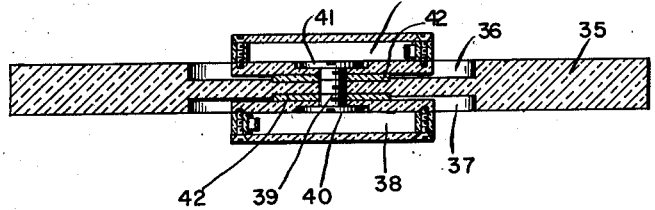
INVENTOR
VIRGIL A. SCHOENBERG
BY
Rummler, Rummler & Davis
ATTORNEYS Patented Apr. 25, 1950

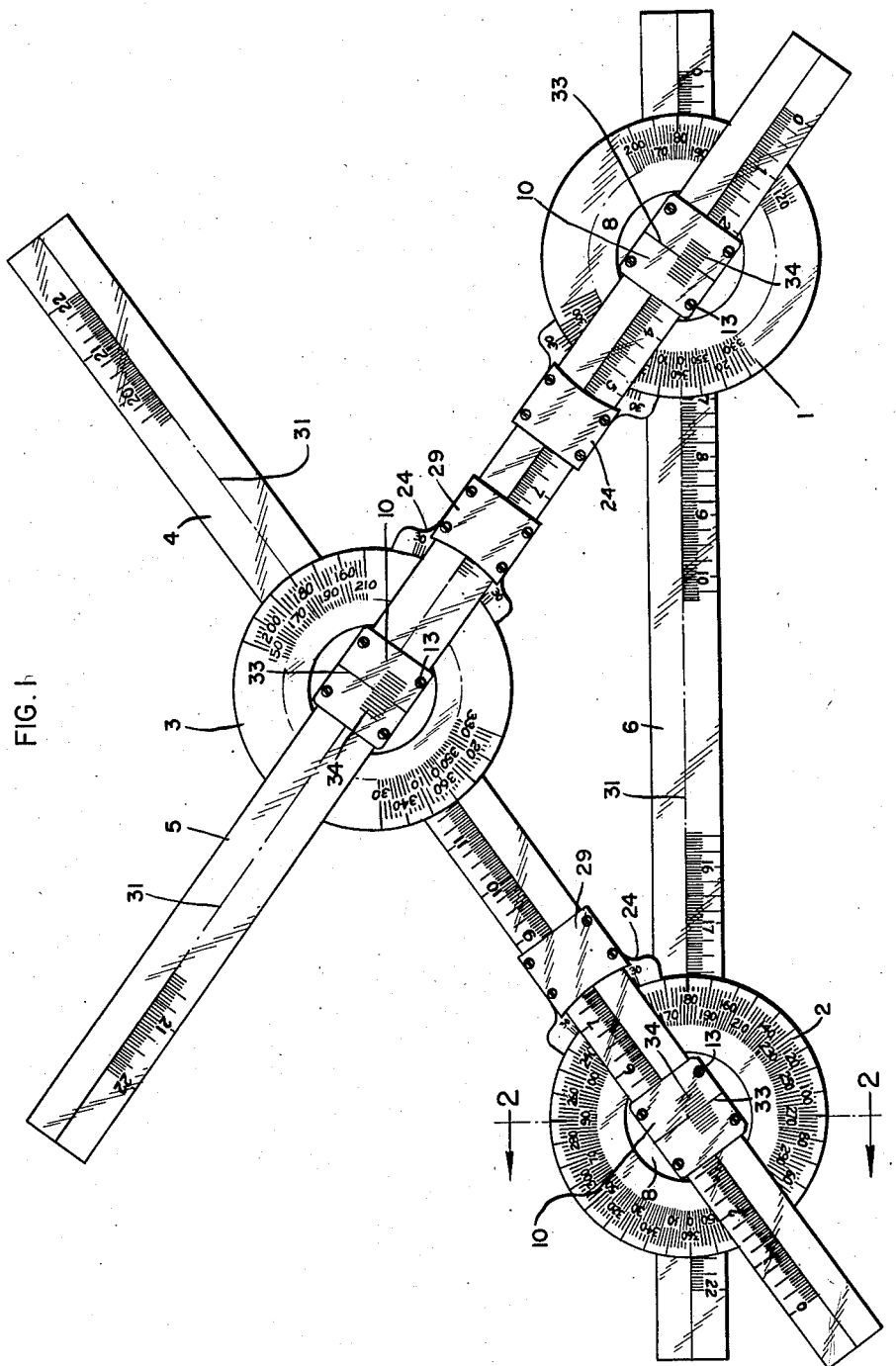

2,505,149

UNITED STATES PATENT OFFICE 2,505,149

TRIGONOMETRIC CALCULATOR

Virgil A. Schoenberg, Glen View, Ill.

Application November 21, 1946, Serial No. 711,441

2 Claims. (Cl. 33—98)

This invention relates to trigonometric calculating devices and particularly to such an instrument, embodying pivotally connected graduated protractors and straight-edge measuring arms, arranged to set up the known factors of a given trigonometric problem and, by direct reading from the instrument, evaluate the unknown factors of the problem.

The main objects of this invention are to provide an improved trigonometric calculating device whereby trigonometric problems may be evaluated without the aid of texts, tables or formulae; to provide such a device having interchangeable parts of simplified construction; to provide such a device having two basic elements which may be combined in multiples for the evaluation of substantially any problem in plane trigonometry; to provide an improved trigonometric calculating instrument that may be more easily read and utilized with maps and charts; and to provide such a device of standardized parts which can be manufactured easily, accurately, and at a low cost.

A specific embodiment of this invention is shown in the accompanying drawings in which:

Figure 1 is a plan view of a calculating instrument embodying the invention and illustrating a manner in which the elements may be combined to provide an instrument for evaluating trigonometric problems.

Fig. 2 is a sectional view of the improved protractor element, as taken on line 2—2 of Fig. 1.

Fig. 3 is a fragmentary sectional view of the same, as taken on line 3—3 of Fig. 2.

Fig. 4 is a fragmentary plan view of the same, as taken on line 4—4 of Fig. 2.

Fig. 5 is a perspective view of a vernier for use with the protractor, partly broken away to show its construction, and Fig. 6 is a sectional view similar to Fig. 2, showing a modification of the protractor construction.

In the form shown in the drawings, particularly in Fig. 1 thereof, the improved calculating device comprises three circular protractors 1, 2 and 3, and three arms or straight edge members 4, 5 and 6 which are slidably and pivotally connected to the protractors at their centers so as to coact with the marginal scale of angular measurement on the protractor.

As indicated in Fig. 1, the measuring arms or straight edges are received in slides mounted centrally on the protractor body and are shiftable longitudinally in the said slides. Also, at least one of the slides is pivoted on the protractor body so that when the parts are assembled as shown in Fig. 1, they may be shifted relative to each other to vary the length of the arms between the protractors and to vary the angular relationship of the parts.

Thus the protractor elements 1 and 2 may be set in any desired position or spacing along the arm 6 and the protractor 3 may be set at any desired position along the arms 4 and 5; and any shape of triangle between the centers of the three protractors may be formed.

In the form shown each protractor is a flat, circular body having a marginal or circular scale preferably arranged to indicate degrees of angular arc or measurement and each arm or straight edge is a flat member of any desired length having parallel sides and faces and having a longitudinal hairline which may be divided according to any desired or predetermined scale. Also each arm is provided with an arcuately shaped transversely positioned vernier member, slidably mounted on the arm and arranged to coact with the marginal scale of one of the protractors with which the arm is directly associated. The vernier is preferably scaled or calibrated to indicate minutes of arc.

In the form shown in Figs. 2 and 3, wherein protractor element has only one of its slides pivotally mounted, the body of the protractor is in the form of a flat disc 7 having a central recess or depression 8 in which the pivoted or rotatable slide is disposed. The slide is of the box type, rectangular in form and having open ends through which the shiftable arm is passed. This box slide comprises a bottom member 9 and a top member 10 connected by side members or spacers 11 and 12 and held together by means of suitable screws 13.

The rotatable box slide is mounted on the protractor body 7 so as to overlie or include the geometric center of the circular protractor scale formed on the body 7 and is arranged to pivot or turn about an axis through the geometric center of said circular scale.

In the arrangement shown the rotatable box slide is disposed concentrically on the axis or geometric center of the protractor scale and is pivotally connected to the body 7 by means of a flathead screw 14 which extends through the body 7, at the geometric center of the protractor scale, and through the bottom member 9 of the slide. The slide is secured by means of a flat nut 15 which is countersunk into the upper surface of the bottom slide member 9 so as to be flush therewith. Also the flathead 16, of the screw or bolt 14, is countersunk into the opposite face of the body 7 so as to be flush therewith.

The nut 15 is fixed to the screw 14, after it has been properly set in place, so that the box slide may turn freely relative to the screw and nut and, to facilitate such turning, a washer 17 is disposed between the body 7 and the lower slide member 9. The thickness of the washer 17 is preferably guaged so that the upper surface of the bottom slide member 9 will be flush with the scale carrying face of the body 7.

The fixed or non-rotatable box slide shown in Fig. 2 comprises a pair of parallel side members or spacers 18 and 19, and a cover member 20, mounted on the body 7 by means of suitable screws 21 and disposed over the axis of rotation of the rotatable box slide, preferably concentric therewith.

Also, as shown in Figs. 2 and 3, each box slide is provided with a spring friction member 22 mounted on one of the side members or spacers and arranged to bear against the edge of the arm shiftably positioned in the slide. This spring is a flat, curved member held in place by laterally projecting lugs, or pintles 23, which extend into suitable openings in the bottom and top members 9 and 10 of the slide, as shown in Fig. 3. The spring 22 is resilient and is curved so that its central portion will project into the path of the arm inserted into the slide and be frictionally engaged by the side edge of the arm.

In the form of protractor shown in Fig. 2, the lowermost or fixed slide will preferably be positioned on the body 7 so that the open ends of the slide will be aligned with the 0–180° line of the protractor scale. Also the cover members 10 and 20 of the rotatable and fixed slides respectively, are each provided with a transverse index line which intersects the axis of rotation, or the geometric center of the protractor scale.

The sliding vernier, which is mounted on each arm or straight edge for coaction with a respective protractor scale, is shown in Fig. 5 and as shown comprises a body 24 having a circularly curved forward portion 25 adapted to fit against the edge of the circular protractor body 7. As shown, the forward portion 25 extends laterally on each side of the body 24 and carries, on its upper surface, a scale 26 of vernier measurement proportioned to the measurements of the protractor scale. The zero line of this vernier scale is preferably centered relative to the body 24 and the vernier scale progresses on each side of the zero line in increments representing minutes of arc.

A box slide comprising side members 27 and 28 and a top or cover member 29 is built onto the upper surface of the body 24 and the ends of this slide are left open to receive the arm or straight edge 30 in sliding engagement, which arm has a central hairline 31 positioned to be aligned with the zero line of the vernier scale when the vernier is mounted on the arm. A spring 32 is provided in one of the side members of this box slide for frictional engagement with the edge of the arm when the vernier is mounted on the arm.

All of the elements of the herein-described calculating device, except those which of necessity must be made of metal, are to be constructed of a suitable transparent material such as a clear, colorless plastic, in order that scale markings, etched or cut into the working surface of each element, will be visible through the material.

Thus it will be seen that when the several elements are assembled in the desired arrangement, for example, the arrangement shown in Fig. 1, the several scale markings are readily visible through the elements though several of the elements are superposed at the point where the reading is to be made.

In the arrangement shown in Fig. 1, the arm 6 is considered the base line and is inserted through the fixed slides on the underside of the protractors 1 and 2. The arms 4 and 5 are then inserted through the fixed and rotatable box slides respectively, of the protractor 3 and then a free end of each of the arms 4 and 5 are inserted through the upper rotatable box slides of the protractors 1 and 2. When in such arrangement, the elements can be readily adjusted to form any shape of triangle and when so adjusted, the angular relationship of the arms can be readily read, through the clear transparent material of the elements, from the protractor scale. Also the proportionate length of the arms between the protractor centers can be readily determined from suitable scales formed on the arms along the longitudinal hairline 31.

As before mentioned, the cover members 10 in the uppermost or rotatable box slides are each provided with a transverse hairline, indicated at 33 in Fig. 1, which hairline intersects the center of rotation of the respective box slide. Also a vernier scale 34 may be provided on the cover members 10 for fractional readings of the scale provided on the arms.

As shown in Fig. 1, the vernier slides are mounted on the respective arms before the arms are inserted in the box slides of the respective protractors and each of the verniers is faced to coact with the edge of a respective one of the protractor bodies. For example, the verniers on the arms 4 and 5 will be positioned to coact with the protractors 2 and 3 respectively. The third vernier will of necessity be mounted on the arm 5 so that the transverse scale carrying portion will engage the edge of the protractor 1, since the arm 6 is held in the lower fixed slide and only the arm 5 will swing relative to the protractor 1.

A modified construction of the improved protractor, wherein both the upper and lower box slides are rotatable relative to the protractor body, is shown in Fig. 6. In this form, the protractor body 35 is provided with a central recess 36 and 37 in each face, respectively, and a rotatable box slide 38 is disposed in each recess and mounted so as to turn on an axis through the geometric center of the circular protractor scale formed on the body 35. As shown in Fig. 6, the pivot for the box slides 38 is centered in the protractor body 35 and comprises a bolt 39 which extends through the inner or bottom members of the box slides 38. The head 40 of the bolt 39 and the nut 41 are each counter-sunk in the respective bottom members of the slides 38, so as to be flush with the outer surface of said bottom members, and suitable washers 42 are disposed between the slides and the body 35 to permit easy rotation of the slides, the spacers 42 in each case being of a gauge or thickness such that the surface of the bottom members of the slide which engages the shiftable arm will be flush with the respective face surfaces of the protractor body 35.

When this modified form of protractor is used in a construction such as that shown in Fig. 1, the protractor body will be rotatable relative to all of the arms and the 0–180° line of the protractor scale and may be shifted to any desired position. This form of protractor may be particularly desirable in those cases where more than 3 protractors and 3 arms are combined to construct the calculating device and, in this respect, it is to be understood that more than 2 protractors may be utilized with any one arm as may be necessary to solve some trigonometrical problems.

The main advantages of this invention reside in the interchangeability of the several elements comprising the calculator construction whereby the elements may be combined in substantially any number and arrangement to adapt the calculator to practically every type of problem involving plane trigonometry.

Other advantages reside in the improved protractor construction whereby the form is simplified and whereby scale readings from either the protractor or the arms is more easily and accurately obtained. Still further advantages are to be found in the construction of the calculating device from clear transparent material which permits overlapping relationship of the elements of the device without detracting from the readability of the several scales at a point aligned with the axial center of the protractor.

Although but one specific embodiment of this invention and but two forms of the protractor element thereof are herein shown and described, it will be understood that details of the construction shown may be altered or omitted without departing from the spirit of this invention as defined by the following claims.

I claim:

1. A calculating device comprising a protractor having a circular scale, and a slide on each side of the protractor with its slide opening flush with the respective face thereof and positioned to include the geometric center of said scale, one of said slides being pivotally mounted on said protractor to turn on an axis through said geometric center, a pair of arms disposed one in each of said slides and shiftable longitudinally therein on the plane of the respective face of said protractor, each of said arms having a longitudinal line intersecting the geometric center of the protractor scale, and an arcuate vernier disposed transversely on one of said arms and arranged to be independently slidable therealong, said vernier being disposed in the plane of said scale arranged to coact therewith.

2. A calculating device comprising a plurality of annular disc-like protractors each having a marginal scale and a slide on each of the protractor faces disposed with its slide passage flush therewith and positioned to include the geometric center of the scale, at least one slide on each protractor being pivotally mounted to turn on an axis through the geometric center of the protractor scale, a plurality of arms connecting said protractors, each arm connecting a pair of protractors and being shiftably disposed in respective slides thereof and on the plane of the respective protractor face, and each arm having a graduated longitudinal line intersecting the geometric centers of the respective protractor scales, and a vernier disposed transversely on each of said arms and independently slidable therealong to coact with the scale of one of the protractors with which the respective arm connects, each of said verniers being mounted on its respective arm so as to lie in the plane of the coacting protractor.

VIRGIL A. SCHOENBERG.

REFERENCES CITED

The following references are of record in the file of this patent:

UNITED STATES PATENTS

| Number | Name | Date |
|---|---|---|
| 474,846 | Miller et al. | May 17, 1892 |
| 479,198 | Watson | July 19, 1892 |
| 506,416 | Colley | Oct. 10, 1893 |
| 1,661,096 | Rowe | Feb. 28, 1928 |
| 1,880,683 | Berman | Oct. 4, 1932 |
| 2,093,048 | Ike | Sept. 14, 1937 |
| 2,123,674 | Gottlieb | July 12, 1938 |
| 2,239,229 | Harris | Apr. 22, 1941 |
| 2,244,125 | Siefker | June 3, 1941 |